United States Patent [19]
Ikemori

[11] Patent Number: 4,826,301
[45] Date of Patent: May 2, 1989

[54] PHOTOGRAPHIC SYSTEM HAVING SOFT FOCUS FUNCTION

[75] Inventor: Keiji Ikemori, Kanagawa, Japan

[73] Assignee: Canon Kabushiki Kaisha, Tokyo, Japan

[21] Appl. No.: 926,648

[22] Filed: Nov. 3, 1986

[30] Foreign Application Priority Data

Nov. 11, 1985 [JP] Japan ................. 60-252451
Nov. 25, 1985 [JP] Japan ................. 60-264371
Mar. 6, 1986 [JP] Japan ................. 61-049328

[51] Int. Cl.⁴ ................. G02B 13/20; G03R 13/18
[52] U.S. Cl. ................. 350/431; 350/450; 354/400; 354/408
[58] Field of Search ................. 350/431, 450; 354/400–409

[56] References Cited

U.S. PATENT DOCUMENTS 4,124,276 11/1978 Okano et al. ................. 350/431

Primary Examiner—John K. Corbin
Assistant Examiner—Scott J. Sugarman
Attorney, Agent, or Firm—Toren, McGeady & Associates

[57] ABSTRACT

A photographic objective having a soft focus function comprising, from front to rear, a first lens component of positive power, a second lens component having a meniscus-shaped lens of forward convexity, an aperture stop, and a third lens component, the second lens component being axially movable for the purpose of producing a soft focus effect, and a technique of compensating for the image shift resulting from the movement of the soft focus-introducing lens component by automatically readjusting the position of the focusing lens component, are disclosed.

11 Claims, 15 Drawing Sheets

LATERAL ABERRATION

LATERAL ABERRATION

LATERAL ABERRATION

LATERAL ABERRATION

LATERAL ABERRATION

LATERAL ABERRATION

LATERAL ABERRATION

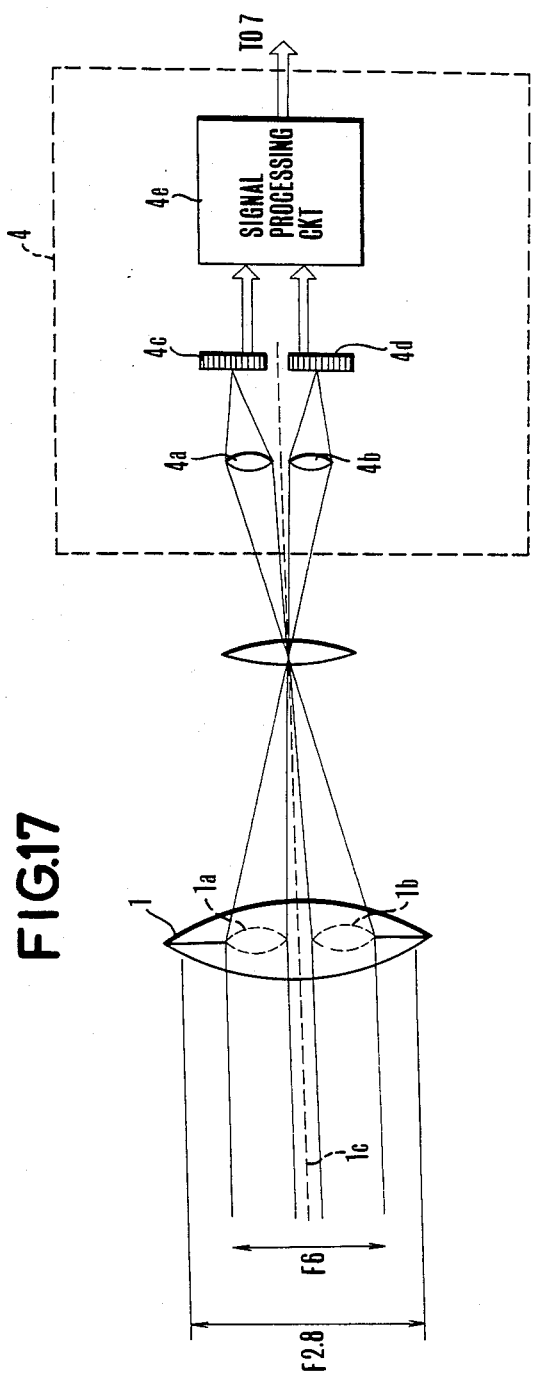

PHOTOGRAPHIC SYSTEM HAVING SOFT FOCUS FUNCTION

BACKGROUND OF THE INVENTION

1. Field of the Invention

This invention relates to objective lens systems having a soft focus function suited to photographic cameras or video cameras, and, more particularly, respectively to the introduction of spherical aberration into the objective lens system by axially moving a lens component constituting part of the system.

2. Description of the Related Art

Many photographic objectives that are made capable of occasionally producing soft focus effects so that pictures of soft feeling will be obtained, have been proposed. The production of the soft focus effect is attained by introducing into the optics controlled aberrations, mainly a certain type of spherical aberration. For example U.S. Pat. Nos. 4,013,347, 4,124,276 and 4,310,221 disclose photographic lens systems in which the amount of spherical aberration is varied to a large degree so that desired soft focus effects are obtained.

Of these, U.S. Pat. No. 4,124,276 creates an air lens between two lens surfaces which turn their concavities toward the point at which the principal ray at the full open aperture intersects the optical axis. To vary the soft focus effect, the two lens components, between which the air lens intervenes, are made to axially move at different speeds from each other. To effect focusing down to shorter object distances, the lens system as a whole is moved axially forward.

Because this method necessitates not only the provision of the air lens, which is not required for preserving the image quality in normal photography, but also the lens components which control the soft focus effect, and further because these lens components have to move not only when focusing is performed, but also at different speeds from each other when the soft focus effect is produced, the lens system and its operating mechanism tends to become very complicated in structure.

In U.S. Pat. No. 4,013,347, use is made of an optical member whose central portion is a parallel plate of no refractive power, and the marginal portion has increasing refractive powers as the radial distance from the optical axis increases. To obtain a desired soft focus effect, the optical member is axially moved. This method has a disadvantage that in order to obtain the soft focus effect, the optical member, which is unnecessary when in normal photography, must be newly provided.

In U.S. Pat. No. 4,310,221, by varying the air separation between the front component of positive power and the rear component of negative power, the soft focus effect is obtained, while focusing is performed by moving the lens system as a whole. This method had a disadvantage that the complexity of the structure o the operating mechanism for moving the components tends to increase.

Also, concerning the refocusing technique, U.S. Pat. No. 3,972,056 discloses the utilization of the output of the focus detector, but it has no description about the soft focus effect. Moreover, any concrete structure of the focus detector is not illustrated at all.

For uniformity of illumination with softening over the entire area of the image format, the marginal illumination has generally to be very largely increased when soft focusing.

In normal photography, however, contradistinctively, the marginal illumination is not necessarily as high, and such an increase in the marginal illumination rather causes the image quality to lower as the added light beam becomes flare. For this reason, the addition of the soft focus function to the photographic objective makes it very difficult to preserve the high grade of imaging performance when in normal photography.

Further, in soft focus photography, the spherical aberration introduced into the image format at any rate is so large that it is impossible for the human eye to carry out an accurate focusing even with the help of an optical range finder such as a microprism or a split prism. So, prior to take a shot with the soft focus effect, the photographer had first to set the lens system in the normal position to do focusing, and then to move the soft-focusing lens component.

The change from the normal to the soft focus position causes the image plane of sharpest focus to shift by a distance depending on the amount of spherical aberration introducible into the image format. Therefore, it has also been necessary to perform focusing again after the soft-focusing lens component is set.

Hence, the prior art has required for the photographer to re-adjust the position of the focusing lens component frequently until a desired soft focus effect is reached, being very troublesome and time consuming.

SUMMARY OF THE INVENTION

A first object of the invention is to provide a photographic system having a soft focus function in which proper rules of lens design are set forth so that mere axial movement of part of the lens components which all contribute to the normal imaging suffices for efficiently obtaining the soft focus effect and allows for simplification of the structure of the operating mechanism for the lens system.

Under this object, the lens system is constructed with, from front to rear, a first lens component of positive power, a second lens component in the meniscus form convex toward the front, an aperture stop and a third lens component, whereby the second lens component is made axially movable to produce a soft focus effect.

A second object of the present invention is to provide a photographic system having a soft focus function in which proper rules of lens design are set forth so that despite one of the lens components which all contribute to the normal imaging is axially moved to effect softening the photographic image, it is when in normal photography that high grade imaging performance can be preserved over the entire area of the image format, while permitting a simplification of the structure of construction of the lens mounting mechanism to be achieved.

Under this object, in application to the lens system comprising, from front to rear, a first lens component of positive power, a second lens component having a meniscus-shaped lens of forward convexity, an aperture stop and a third lens component, the second lens component being axially movable to produce a soft focus effect, the effective diameter of the aforesaid second lens component is made to be determined by the maximum diameter of the axial light beam at the maximum soft focus effect.

A third object is to provide for the photographic system having the soft focus function and the structure described above, with automatic means making it possible to compensate for the shift of an image plane of sharpest focus resulting from the changeover from the normal to the soft focus position by utilizing a focus detector, thereby giving an advantage of taking a shot with a good soft focus effect quickly and easily.

To achieve this, in application to the photographic lens including two lens components, one SF of which is used for softening the image, and the other F of which is used for focusing, the amount of shift of the best image plane resulting from the movement of the aforesaid softening lens component SF is measured by focus detecting means positioned to receive a light beam passing through the photographic lens, and drive means, responsive to the output signal from the focus detecting means, moves the aforesaid focusing lens component F to readjust focusing.

Other objects will become apparent from the description of embodiments of the invention by reference to drawings.

BRIEF DESCRIPTION OF THE DRAWINGS

FIG. 17 is a schematic view of an optical system taken to explain the present invention.

DETAILED DESCRIPTION OF THE PREFERRED EMBODIMENTS

Figure 1:
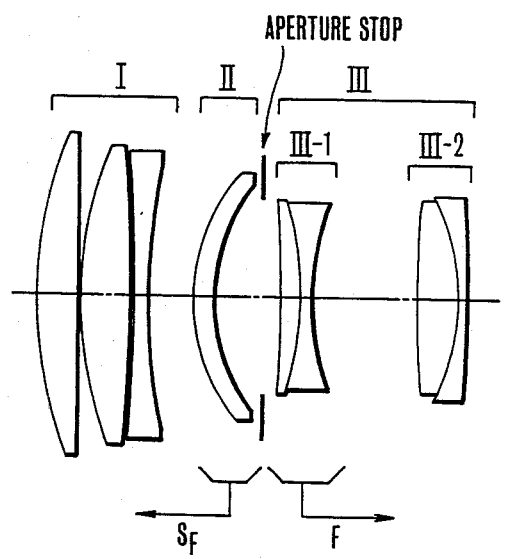
FIGS. 1, 2 and 3 are longitudinal section views of examples 1 to 3 of specific lenses of the invention, respectively.
Figure 2:
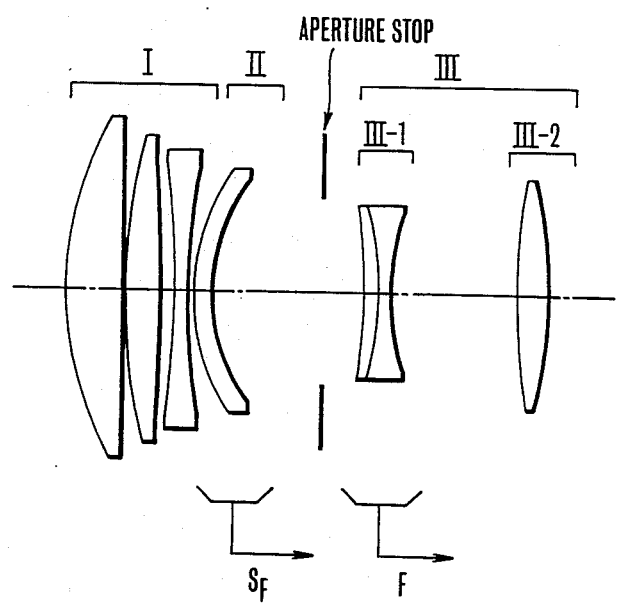
Figure 3:
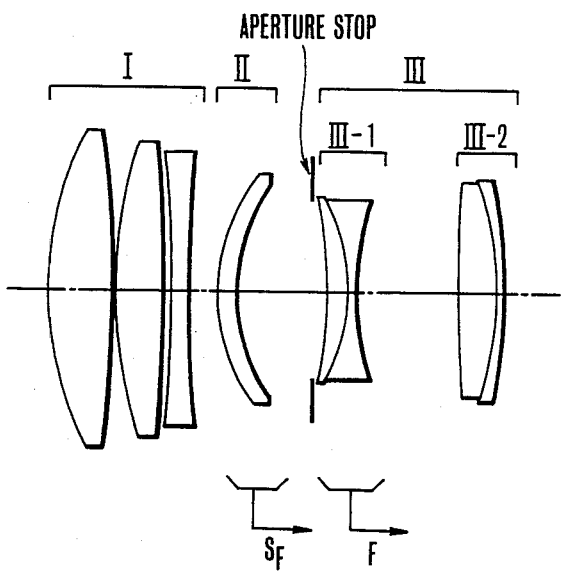
Figure 11:
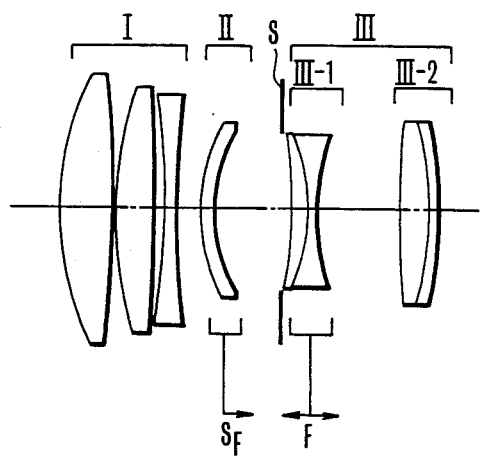
FIGS. 10(A), 10(B) and 11 are longitudinal section views of examples 4 and 5 of specific lenses of the invention, respectively, with FIGS. 10(A) and 10(B) in the normal and soft focus positions respectively illustrating how the F-number is varied with softening.
Figure 4:
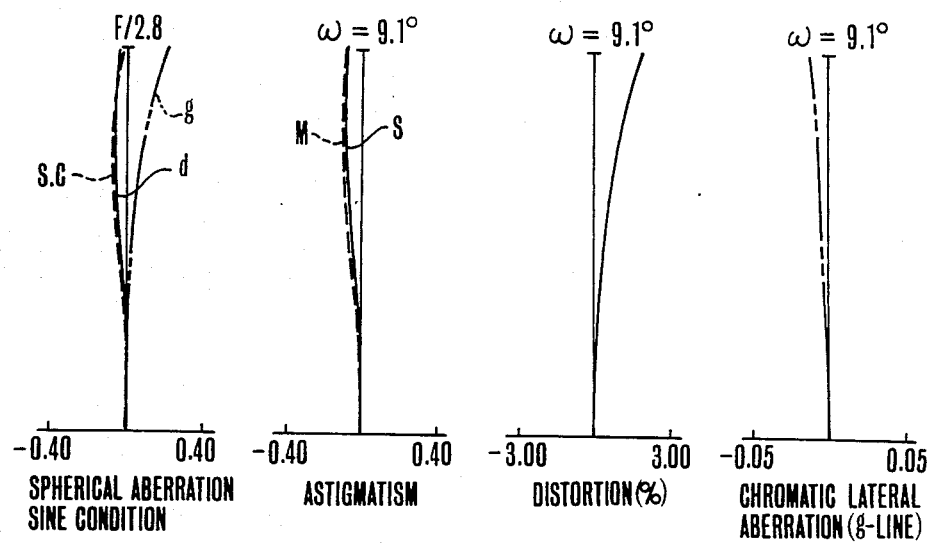
FIGS. 4, 6 and 8 are graphic representations of the various aberrations of the lenses of FIGS. 1 to 3 when in the normal photographic position, respectively.
Figure 4:
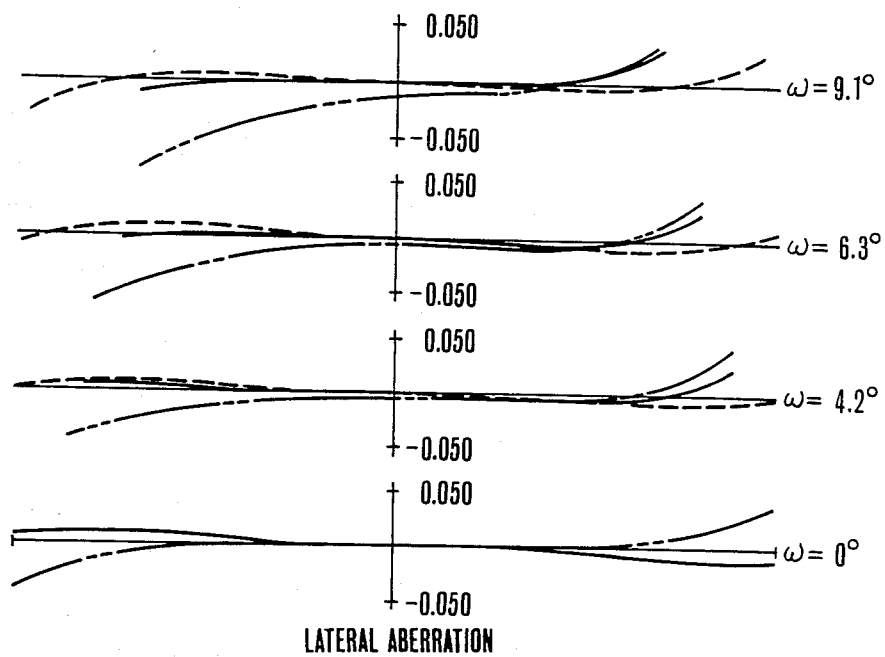
Figure 5:
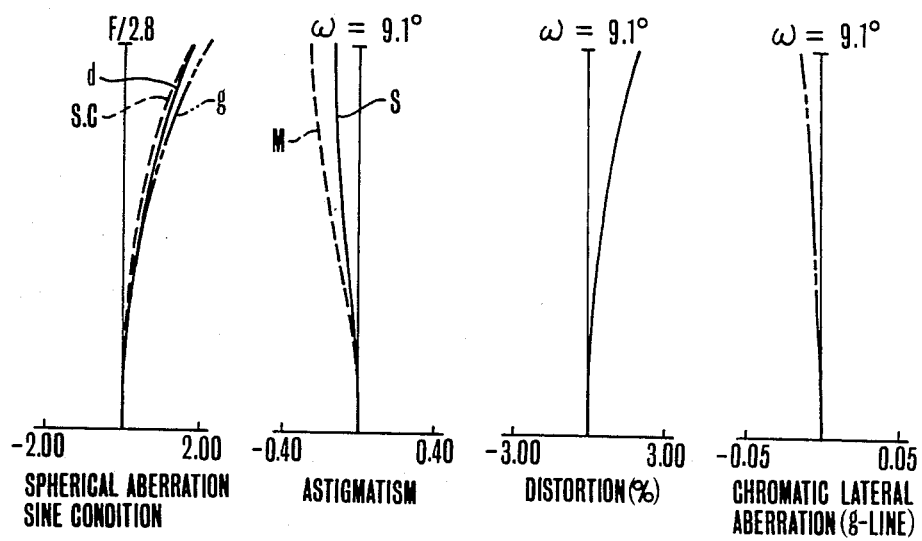
FIGS. 5, 7 and 9 are graphic representations of the various aberrations of the lenses of FIGS. 1 to 3 in the soft focus position, respectively.
Figure 5:
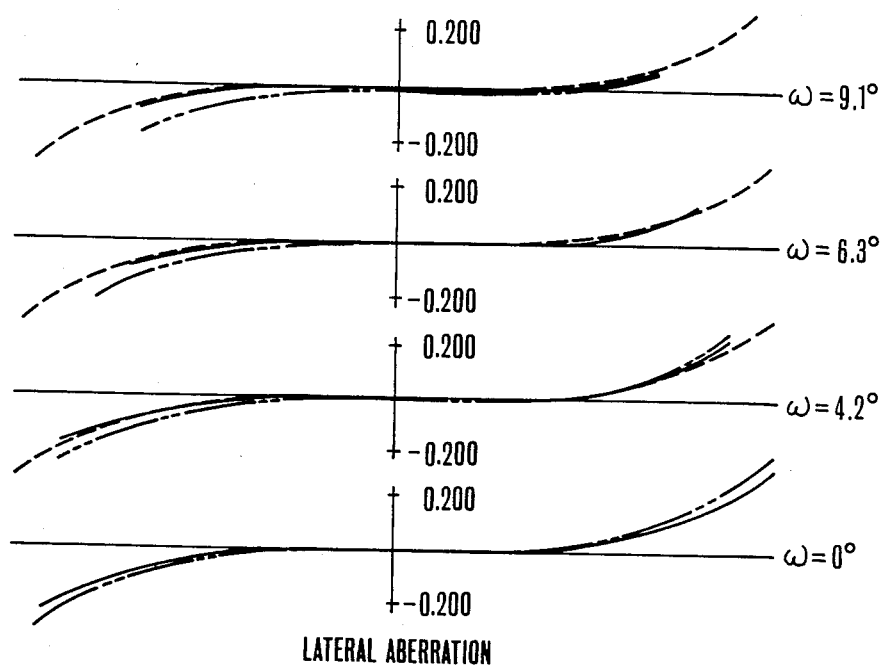
Figure 6:
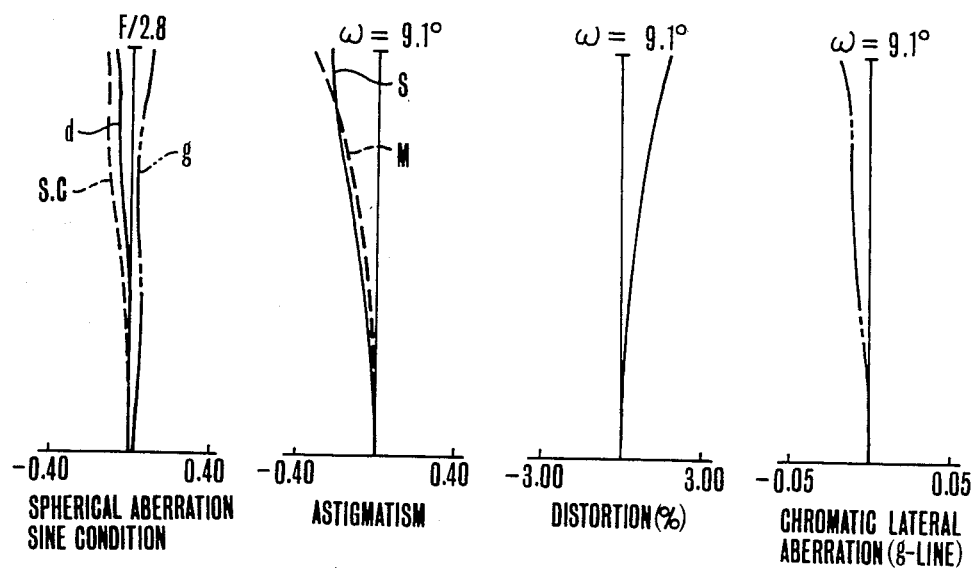
Figure 6:
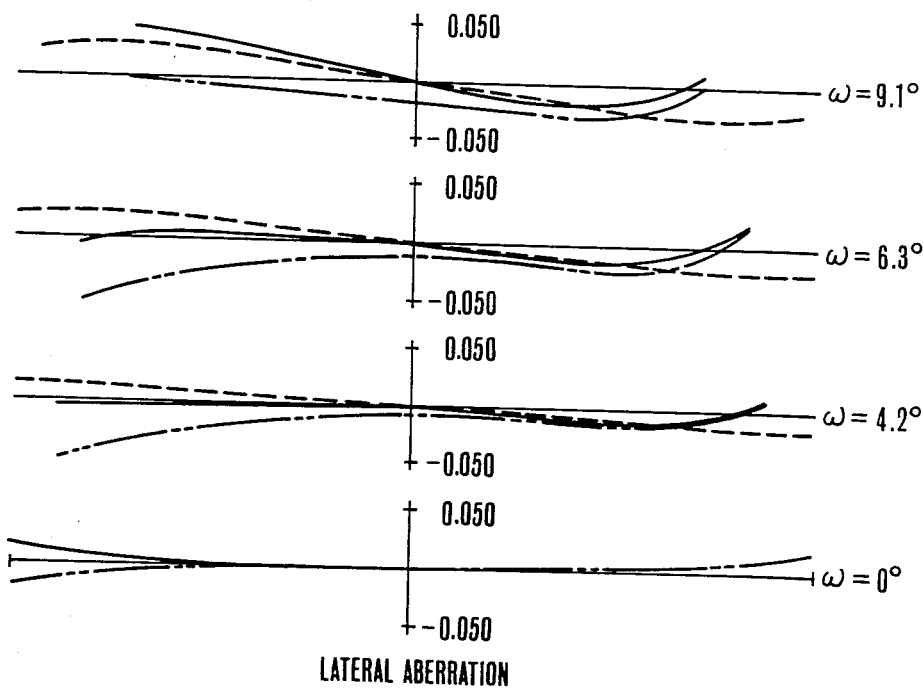
Figure 7:
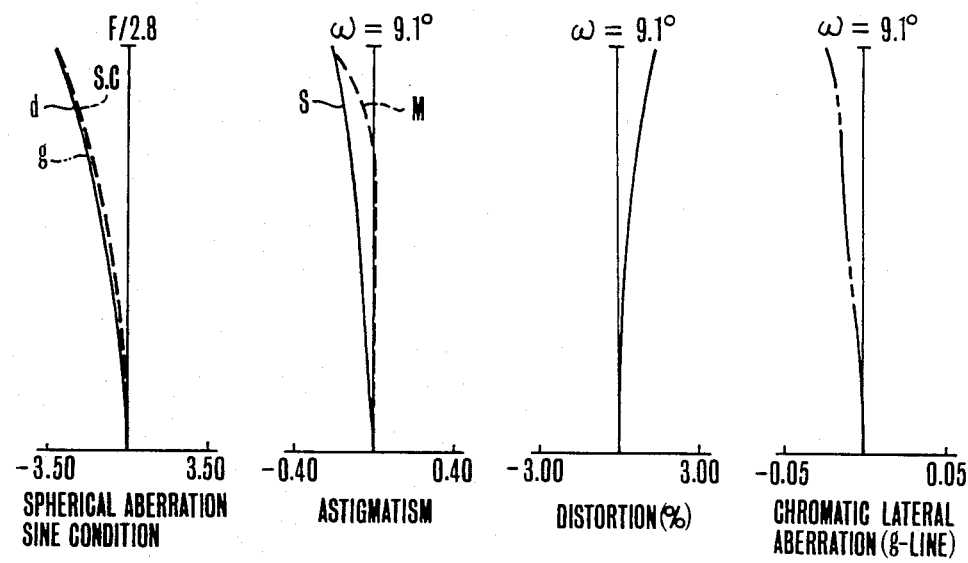
Figure 7:
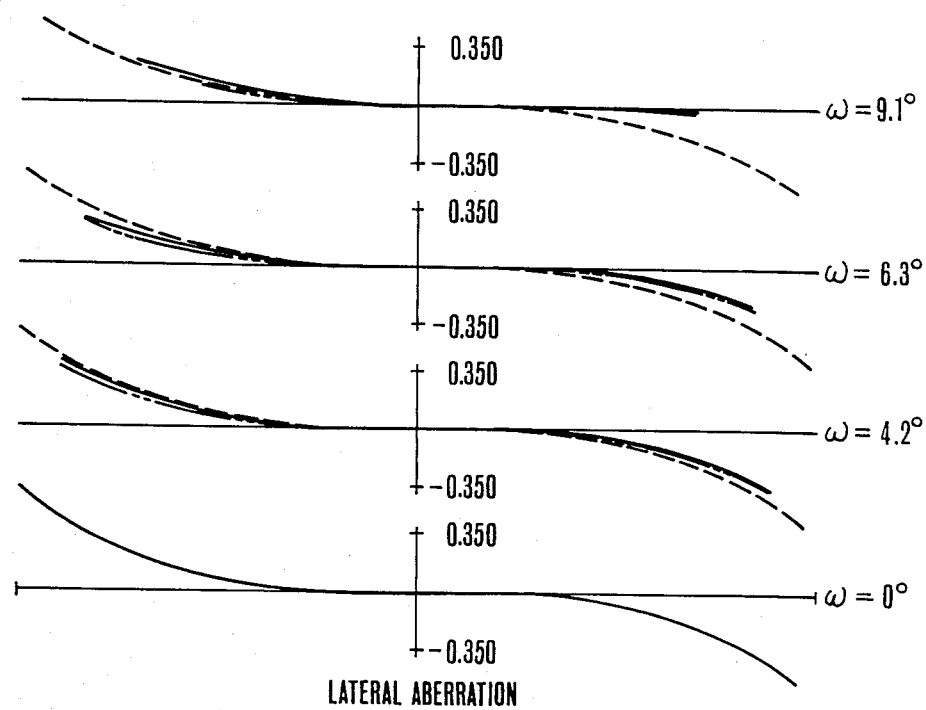
Figure 8:
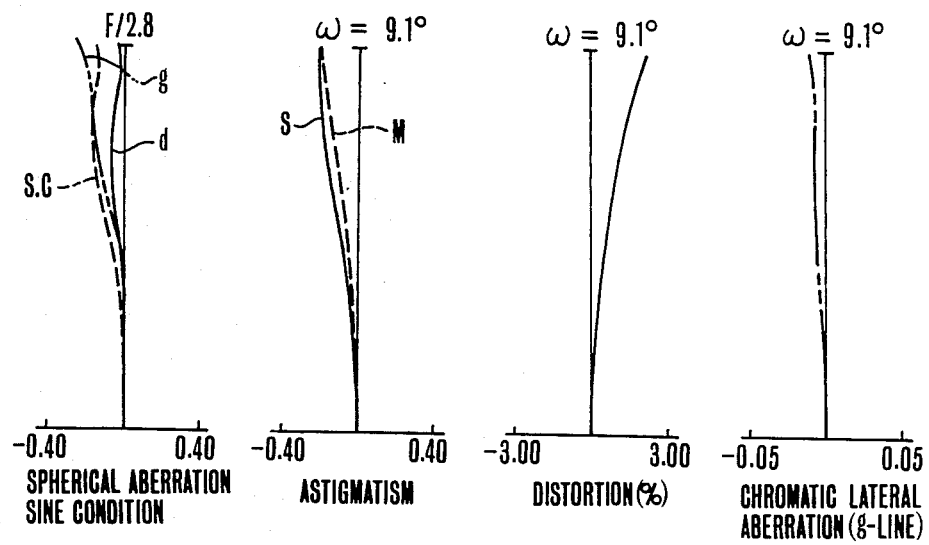
Figure 8:
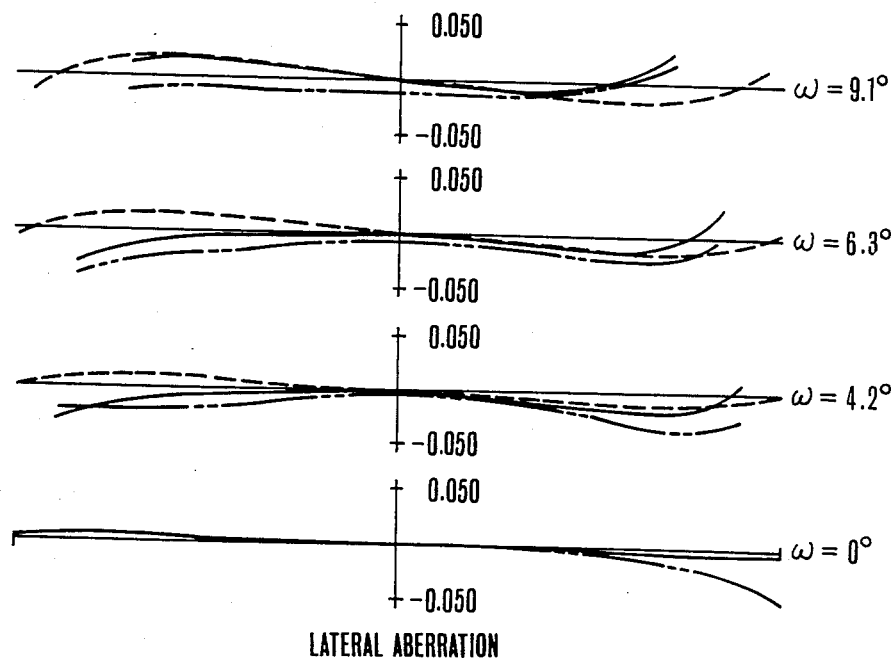
Figure 9:
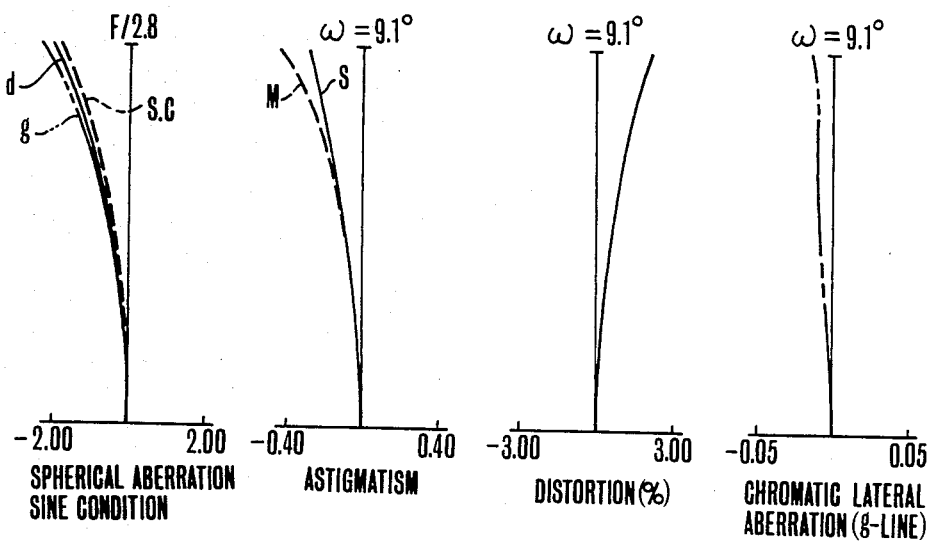
Figure 9:
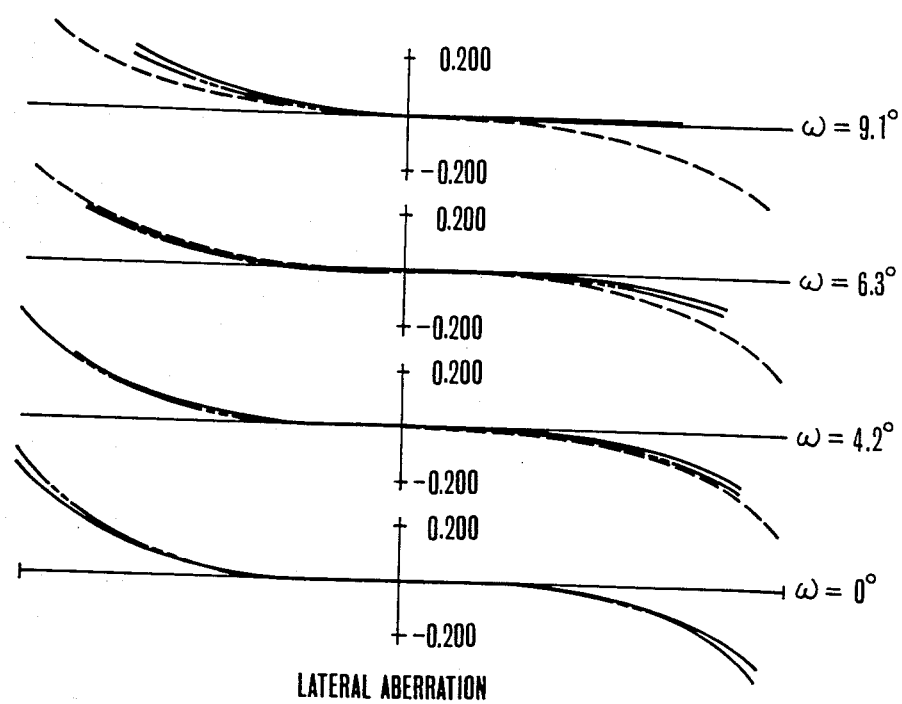

In FIGS. 1, 2 and 3 there are shown three examples 1 to 3 of specific objectives of the invention where I, II and III denote the first, second and third lens components, respectively. An arrow SF indicates the direction of movement, of the soft focusing lens component when softening the photographic image. Another component when, arrow F indicates the direction of the focusing lens component when focusing is effected down to shorter distances.

In the embodiment of the invention, the second lens component II is constructed in the form of a meniscus singlet lens II convex toward the front. By axially moving this lens II, the soft focus effect is selectively controlled. Another feature is that the third lens component III is divided into two parts of negative and positive powers, or lens components III-1 and III-2, of which the front part or the lens component III-1 of negative power is moved rearward to effect focusing down to shorter object distances.

Still another feature of the invention is that the refractive power of the first lens component I is made positive, and the overall refractive power of the second and third lens components II and III is negative, thus constructing the entire system in the telephoto type with an advantage of achieving a shortening of the total length of the objective. Another advantage is that because the focusing provision is made in the front part of the third lens component III or the lens component III-1 which is of small size and light weight, or the so-called rear focusing method is employed, rapid focusing becomes possible. A further advantage is that because the second lens component II is formed by the meniscus singlet of forward convexity, the variation of the aberrations with focusing by moving the lens component III-1 is minimized.

A further feature of the invention is that the axial beam travelling from the first to the second lens component is convergent. If the refractive power of the second lens component II is negative, its soft-focusing movement, when to the rear, results in the introduction of under-corrected spherical aberration into the image format, and when to the front, results in the introduction of over-corrected spherical aberration. If the refractive power of the second lens component II is positive, the direction of correction of spherical aberration is just opposite to the above. And, the amount of spherical aberration introducible into the image format is variable as desired. In the specific examples to be described later, the spherical aberration can be varied in both directions of correction.

A further feature of the invention is that the lens II of the second lens component is made in meniscus form convex toward the front and the aperture stop is positioned behind the second lens component II with the result that the lens II turns its concave surface toward the aperture stop. This implies that while the axial beam is largely refracted, the oblique beam is made to refract as little as possible, thus permitting the difference of the height from the optical axis to vary the soft focus effect as the lens II moves with the limitation of the other aberrations than the spherical aberration to a minimum.

As is understandable from the foregoing, in the embodiment of the Invention, to obtain the soft focus effect, no special lens component is added. Instead, one of the lens components, which are all useful for normal photography, is made movable to achieve the production of soft focus effects. In addition, by imparting independent soft focusing movement into the lens component other than the focusing one, the structure of construction of the operating mechanism is prevented from becoming complicated.

The above-described features of the invention suffice for accomplishing the objects thereof. Yet, to allow for efficient production of soft focus effects, it is better to satisfy the following condition:

$$-0.8 < f/f_{II} < 0.1 \qquad (1)$$

where f and $f_{II}$ are the focal lengths of the entire system and the second lens component II, respectively.

When this condition is satisfied, the variation of the aberrations other than spherical aberration with axial movement of the second lens component II is minimized, and variation of the aberrations with focusing can be well corrected when the rear focusing method is adopted. If the refractive power of the second lens component II is too strong or too weak beyond the range of (1), the soft-focusing movement of the second lens component II cannot be made without causing astigmatism, coma and distortion to increase objectionably.

In the embodiment of the invention, it is also preferred that at least one of the lens surfaces within the second lens component II is made aspheric with such figuring that the refractive power becomes progressively stronger or weaker as the height from the optical axis increases. This enables only the spherical aberration to be largely affected, but the other aberrations to be little influenced. So, any desired soft focus effect can be very easily obtained.

Though, in the embodiment of the invention, the refractive power of the second lens component II may be either positive or negative provided the condition (1) is satisfied, the examples of specific objectives to be described later employ the negative refractive power and its value falls in the following particular range:

$$-0.5 < f/f_{II} < 0$$

giving an advantage that the amount of movement is reduced to effect an equivalent result of the soft focus effect.

In order to achieve good correction of the various aberrations over the entire area of the image format and, further, respectively good stability of aberration correction over the entire focusing range, it is preferred that the first lens component I be constructed with two bi-convex lenses and a bi-concave lens, and the front part III-1 of the third lens component III is constructed with a doublet consisting of positive and negative lenses cemented together.

It is to be noted that the second lens component II may be constructed with a plurality of positive and/or negative lenses provided that the first and last lens surfaces of this component are convex toward the front.

Three numerical examples of the invention are next shown in the following tables for the radii of curvature, R, the axial thicknesses or air separations, D, and the refractive indices, N, and Abbe numbers, $\nu$, of the glasses of the lens elements with the subscripts numbered from the front to the rear.

| Numerical Example 1 | | | |
|---|---|---|---|
| $F = 135$ $FNO = 1:2.8$ $2\omega = 18.2°$ | | | |
| R1 = 65.00 | D1 = 7.00 | N1 = 1.62299 | $\nu 1 = 58.2$ |
| R2 = −1582.72 | D2 = 0.15 | | |
| R3 = 62.93 | D3 = 8.00 | N2 = 1.60311 | $\nu 2 = 60.7$ |
| R4 = −211.82 | D4 = 0.43 | | |
| R5 = −189.57 | D5 = 2.20 | N3 = 1.80518 | $\nu 3 = 25.4$ |
| R6 = 114.60 | D6 = 7 | | |
| R7 = 28.78 | D7 = 2.69 | N4 = 1.60311 | $\nu 4 = 60.7$ |
| R8 = 25.64 | D8 = 8.37 | | |
| R9 = aperture stop | D9 = 3 | | |
| R10 = −230.51 | D10 = 3.12 | N5 = 1.75520 | $\nu 5 = 27.5$ |
| R11 = −50.13 | D11 = 1.39 | N6 = 1.60311 | $\nu 6 = 60.7$ |
| R12 = 37.77 | D12 = 15.5 | | |
| R13 = 176.55 | D13 = 6.50 | N7 = 1.69680 | $\nu 7 = 55.5$ |
| R14 = −33.07 | D14 = 1.50 | N8 = 1.59551 | $\nu 8 = 39.2$ |
| R15 = −190.88 | | | |
| $f_{II} = -574.96$ | | | |
| $f/f_{II} = -0.235$ | | | |

The maximum distance the second lens component moves forward to effect soft focusing is 6mm.

The aspherical coefficients for R8:

$A = 0$ $B = 2.6405 \times 10^{-7}$ $C = 1.0613 \times 10^{-10}$ $D = 2.4158 \times 10^{-12}$ $E = -2.2353 \times 10^{-16}$

| Numerical Example 2 | | | |
|---|---|---|---|
| $F = 135$ $FNO = 1:2.8$ $2\omega = 18.2°$ | | | |
| R1 = 50.94 | D1 = 9.00 | N1 = 1.62299 | $\nu 1 = 58.2$ |
| R2 = −2561.76 | D2 = 0.15 | | |
| R3 = 94.11 | D3 = 5.50 | N2 = 1.62299 | $\nu 2 = 58.2$ |
| R4 = −378.42 | D4 = 1.92 | | |
| R5 = −189.92 | D5 = 2.20 | N3 = 1.80518 | $\nu 3 = 25.4$ |
| R6 = 135.07 | D6 = variable | | |
| R7 = aspherical | D7 = 2.60 | N4 = 1.58313 | $\nu 4 = 59.4$ |
| R8 = 26.319 | D8 = variable | | |
| R9 = aperture stop | D9 = variable | | |
| R10 = −96.86 | D10 = 2.70 | N5 = 1.75520 | $\nu 5 = 27.5$ |
| R11 = −42.92 | D11 = 1.39 | N6 = 1.54072 | $\nu 6 = 47.2$ |
| R12 = 38.39 | D12 = variable | | |
| R13 = 90.61 | D13 = 5.30 | N7 = 1.48749 | $\nu 7 = 70.2$ |
| R14 = −69.19 | | | |
| $f_{II} = -426.83$ $f/f_{II} = -0.316$ | | | |

| | D6 | D8 | D9 | D12 |
|---|---|---|---|---|
| Normal | 0.8 | 17.57 | 6.3 | 19.7 |
| Soft Focus | 10 | 8.37 | 3.9 | 22.1 |

The maximum distance the second lens component II moves forward from the normal position to effect soft focusing is about 2.4 mm.

The aspherical coefficients for R7:

$A = 1.639 \times 10^{-2}$ $B = 3.847 \times 10^{-6}$ $C = 2.266 \times 10^{-9}$ $D = -1.051 \times 10^{-12}$ $E = 3.609 \times 10^{-15}$

| Numerical Example 3 | | | |
|---|---|---|---|
| $F = 135$ $FNO = 1:2.8$ $2\omega = 18.2°$ | | | |
| R1 = 50.56 | D1 = 10.50 | N1 = 1.43387 | $\nu 1 = 95.1$ |
| R2 = −172.05 | D2 = 0.21 | | |
| R3 = 75.15 | D3 = 7.30 | N2 = 1.49700 | $\nu 2 = 81.6$ |
| R4 = −500.28 | D4 = 1.64 | | |
| R5 = −148.62 | D5 = 2.43 | N3 = 1.72047 | $\nu 3 = 34.7$ |
| R6 = 240.83 | D6 = 4.3 | | |
| R7 = 29.54 | D7 = 2.77 | N4 = 1.58913 | $\nu 4 = 61.0$ |
| R8 = 27.68 | D8 = 12.66 | | |
| R9 = aperture stop | D9 = 2.00 | N5 = 1.75520 | $\nu 5 = 27.5$ |
| R10 = −82.30 | D10 = 3.12 | N6 = 1.61340 | $\nu 6 = 43.8$ |
| R11 = −30.32 | D11 = 1.39 | | |
| R12 = 40.28 | D12 = 16 | | |
| R13 = 190.97 | D13 = 6.00 | N7 = 1.69680 | $\nu 7 = 55.5$ |
| R14 = −49.79 | D14 = 1.50 | N8 = 1.69895 | $\nu 8 = 30.1$ |
| R15 = −77.57 | | | |
| $f_{II} = -1665.02$ $f/f_{II} = -0.081$ | | | |

Figure 10A:
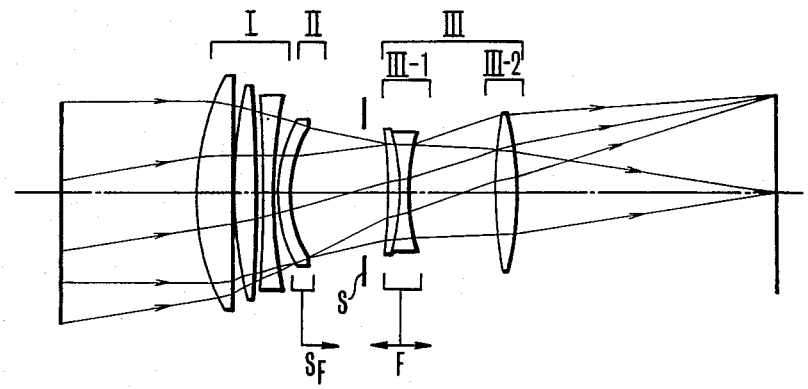
Figure 10B:
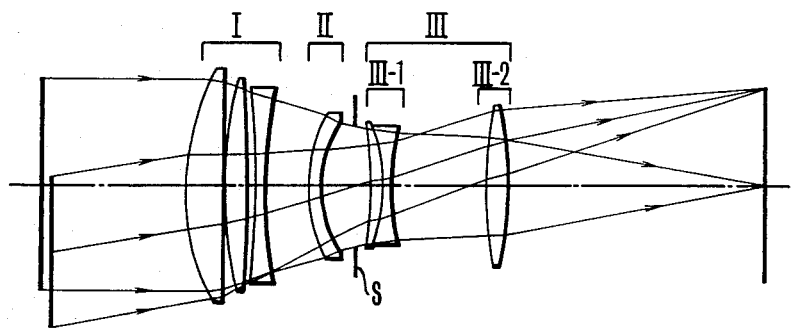
Figure 12:
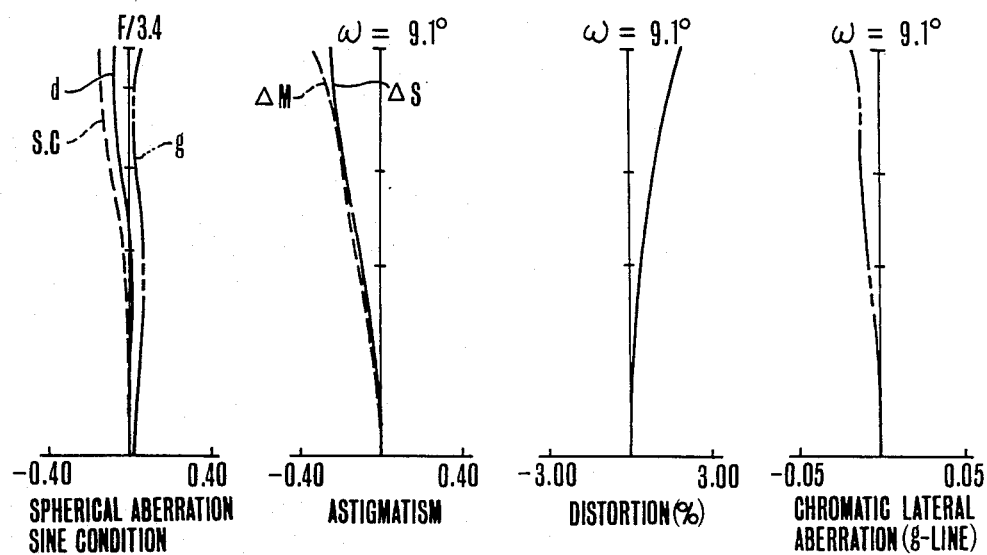
FIGS. 12 and 14 are graphic representations of the various aberrations of the lenses of FIGS. 10(A), 10(B) and 11 in the normal photographic position, respectively.
Figure 12:
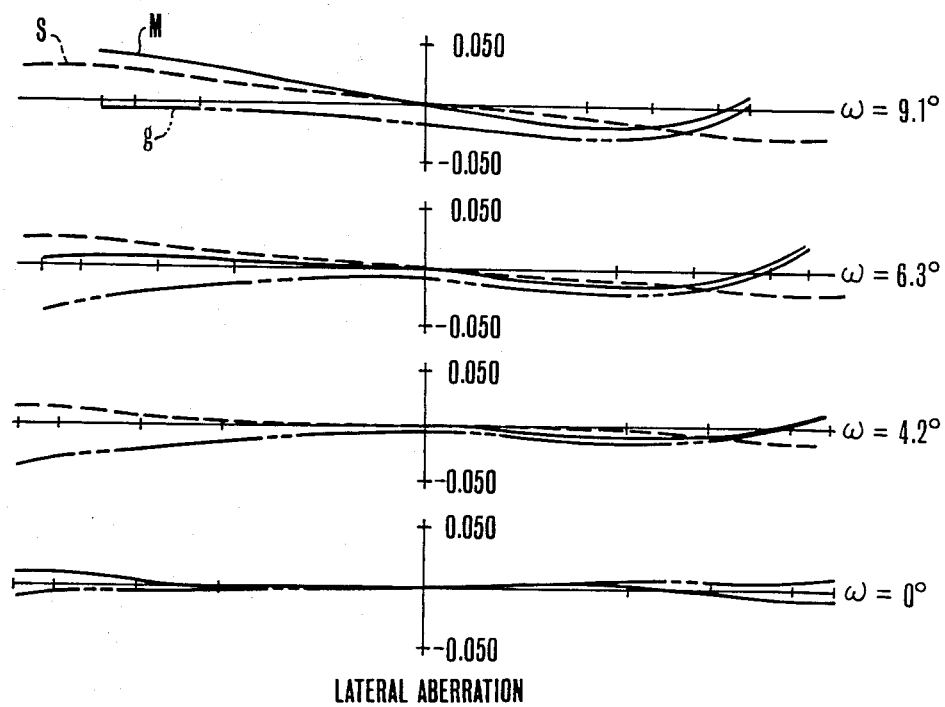
Figure 13:
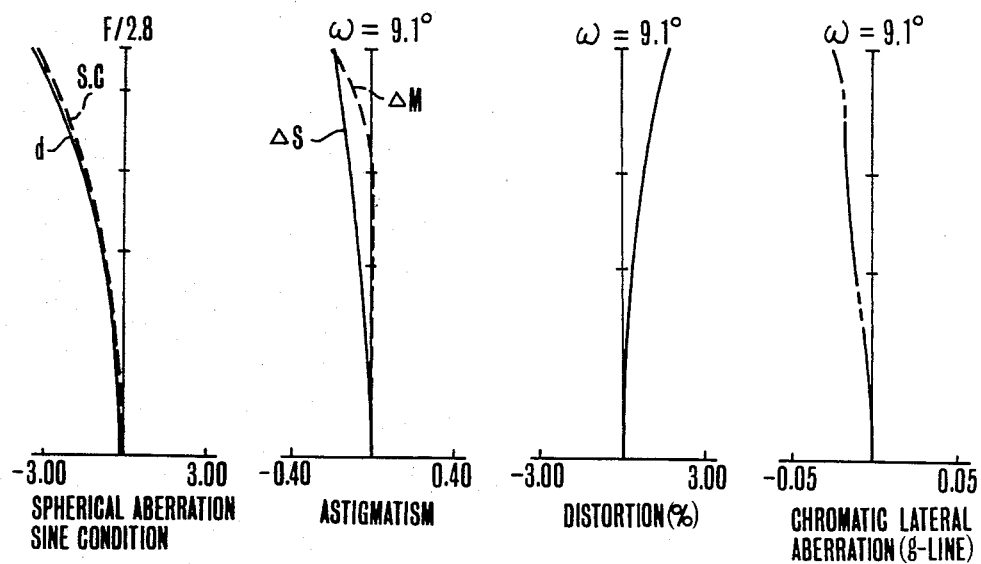
FIGS. 13 and 15 are graphic representations of the various aberrations of the lenses of FIGS. 10(A), 10(B) and 11 in the soft focus position.
Figure 13:
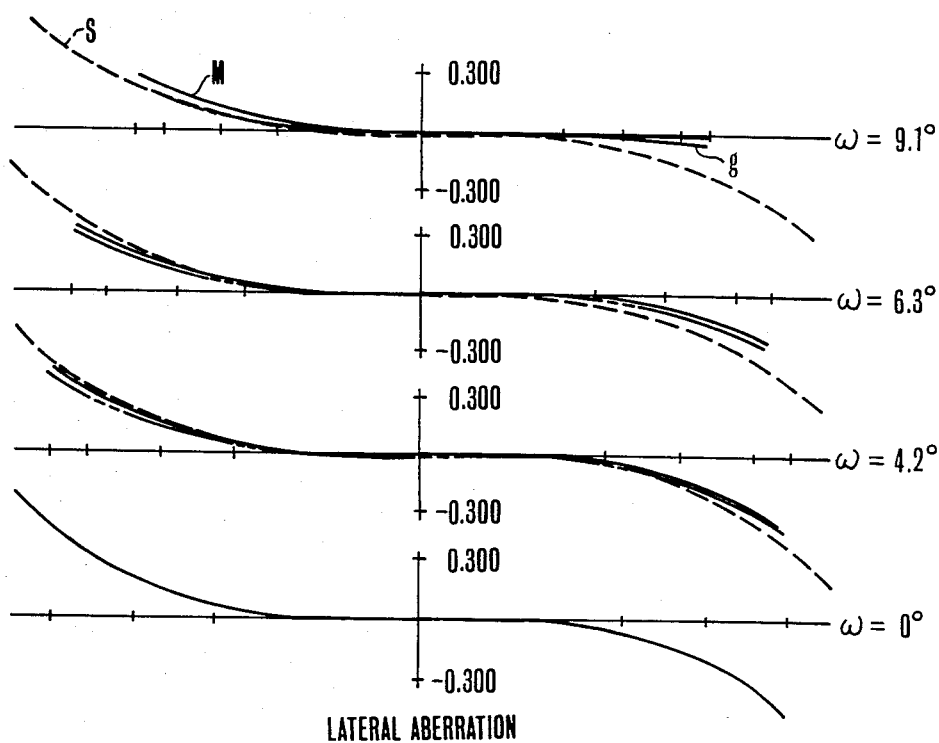
Figure 14:
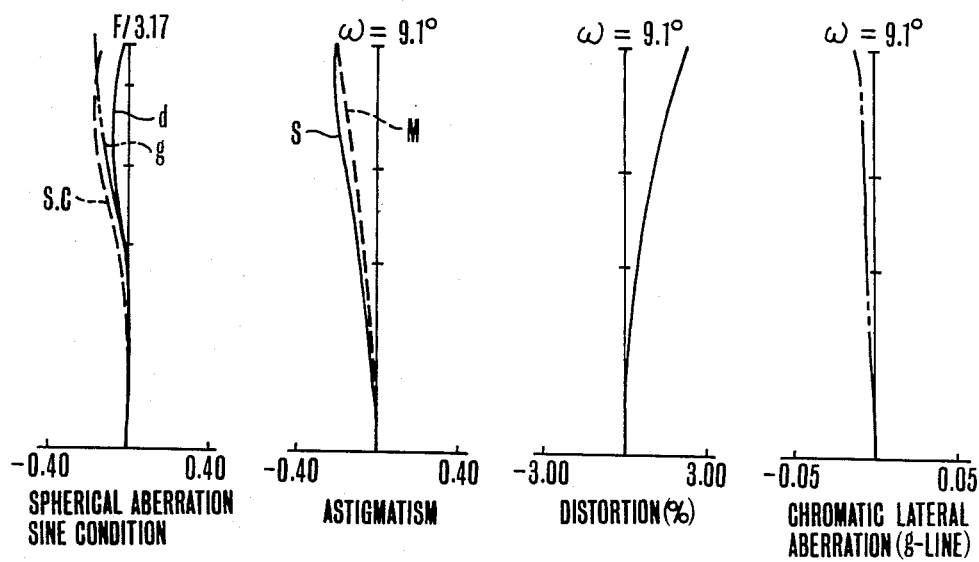
Figure 14:
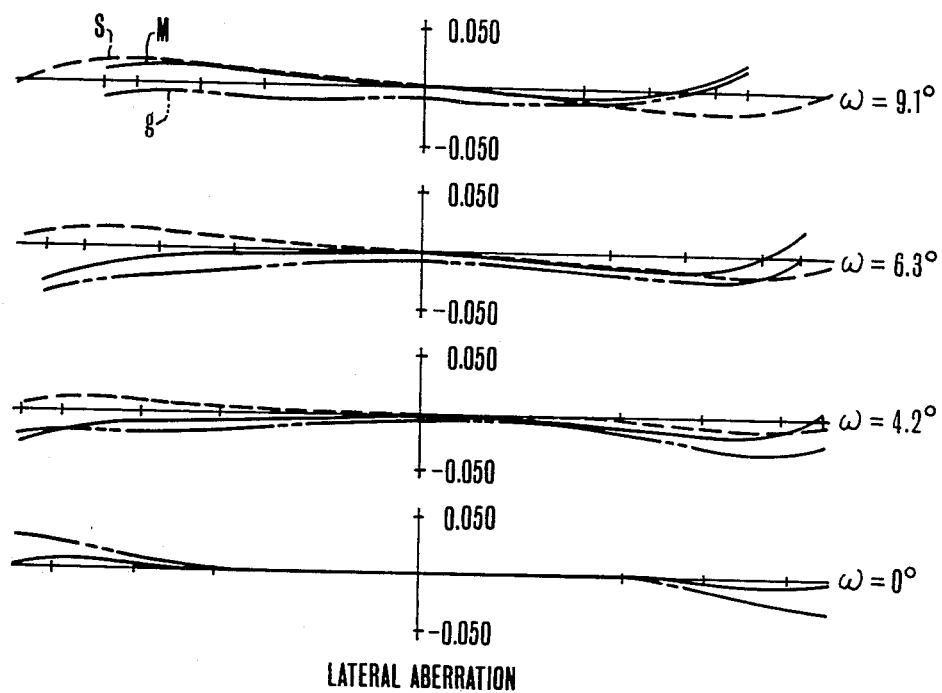
Figure 15:
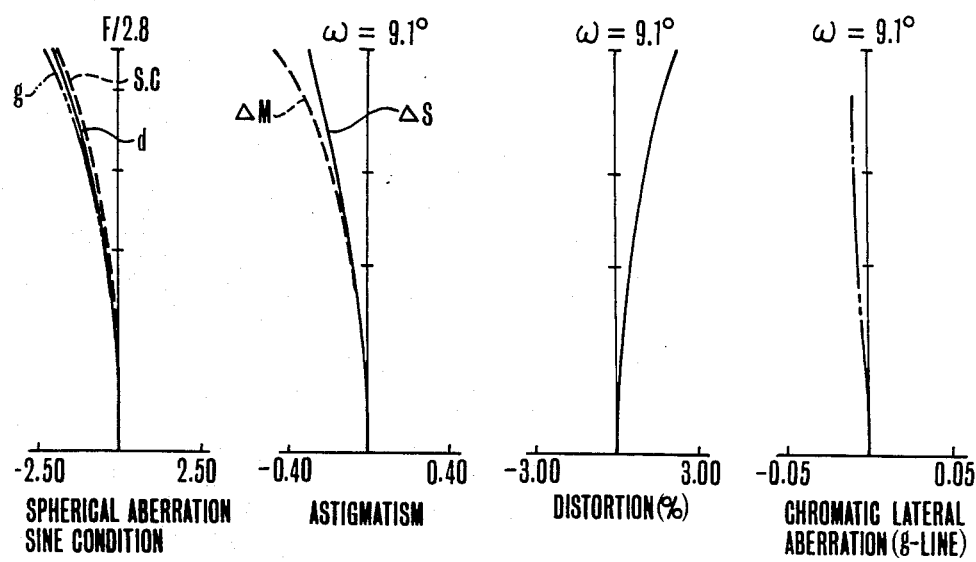
Figure 15:
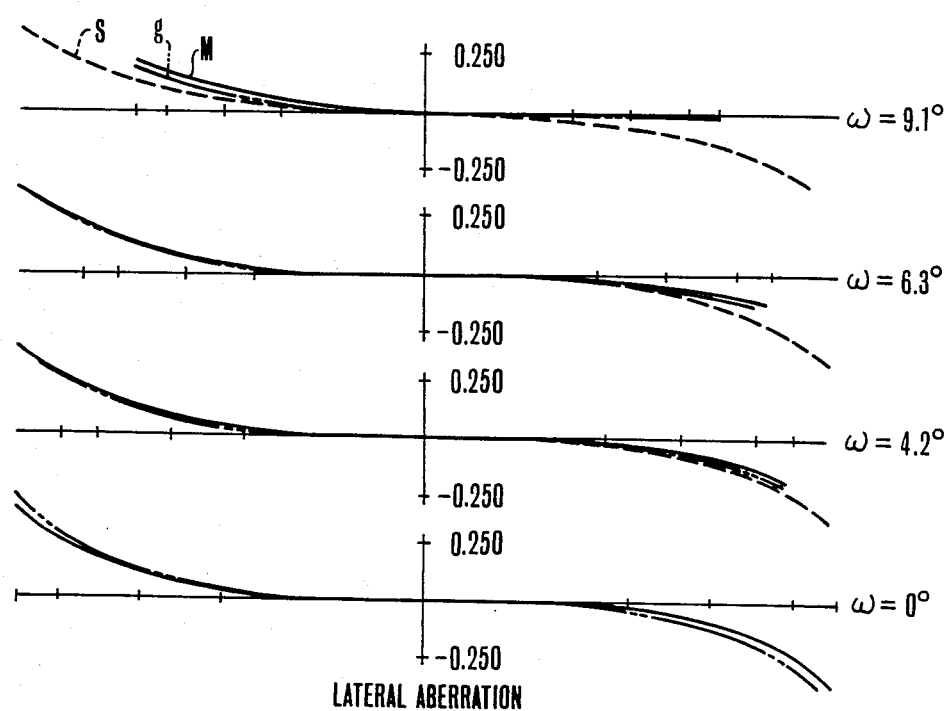

The maximum distance the second lens component II moves rearward to effect soft focusing is 6.2 mm.
The aspherical coefficients for R8:

$A = 0$ $B = 7.669 \times 10^{-7}$ $C = -1.1213 \times 10^{-10}$ $D = 7.5366 \times 10^{-12}$ $E = -2.7247 \times 10^{-16}$ Another embodiment of the invention is next described, where the marginal illumination on the image format is limited. FIGS. 10(A) and 10(B) in block diagrams illustrate a fourth example of a specific objective of the invention in normal and soft focus positions, respectively. In these figures, I, II and III denote the first, second and third lens components, respectively.

In this embodiment, the second lens component II is constructed with a singlet lens of meniscus form convex toward the front, and this meniscus lens is axially moved, in particular, rearward as indicated by arrow SF, when soft focus effects are obtained.

Because, in this embodiment, the first lens component I has a positive refractive power, the axial beam from the first lens component I arrives at the second lens component II in converging state. Therefore, for the constant F-number, the effective diameter of the second lens component II must be determined in terms of the maximum diameter of the axial light beam in the normal photographic position of FIG. 10(A). Nevertheless it is in this embodiment that determination of the effective diameter of the second lens component II is made by that maximum diameter of the axial beam which occurs in the soft focus position of FIG. 10(B). Thereby, the maximum possible speed of the entire system is faster when in soft focus photography than when in normal photography, in other words, the F-number at the full open aperture is made smaller with the result that the illumination is increased over the entire area of the image format. And, the photographic image is softened with diffusing in the foreground or background. Further, the rate of increase of the illumination on the intermediate to the marginal zone of the image format is made higher than on the paraxial zone. Thus, the softening effect is uniformized with an improved result over the entire area of the image format.

For normal photography, on the other hand, the marginal illumination is not necessarily so much increased. Rather a lessening of it is more important from the standpoint of preserving high grade imaging performance over the entire image format. If the F-number in the normal photographic position is taken at the same value when in the soft focus position, however, it would become difficult to obtain, good image quality because the light amount would be too large. On this account, in this embodiment, by utilizing the mobility of the second lens component II for soft focusing, limitations are laid on the maximum diameter of the axial beam and the marginal illumination as the lens system is changed over from the soft focus to the normal position, so that the F-number in the normal position is larger than when in the soft focus position, in other words, the entire system is darker. This enables good correction of aberration to be achieved without involving any increase in the complexity of the structure of construction of the operating mechanism.

That is, when switching the lens system to the normal position, the second lens component II is moved forward. By controlling the total amount of this movement, the amount of the axial light beam is limited to obtain an improved optical performance as a whole.

Another advantage arising from the use of such a method is that while, in the prior art, the marginal illumination was difficult to be arbitrarily limited even when the diaphragm F-number at the aperture stop S was increased in the normal position of FIG. 10(A), it is in this embodiment that the limitation of the marginal illumination can be easily controlled by varying the effective diameter of the, second lens component II.

It should be noted that the values of the F-number when in the normal and soft focus positions of FIGS. 10(A) and 10(B) are, respectively, 3.4 and 2.8.

Also, in this embodiment, the third lens component III is constructed with two lens sub-components III-1 and III-2 of negative and positive powers respectively. Of these, the front lens sub-component III-1 of negative power is moved rearward to effect focusing down.

In this embodiment, a minimization of the total length of the entire system is achieved by constructing the entire system in the form of the telephoto type as comprising the first lens component I of positive power, and the second and third lens components II and III whose overall power is negative. Also, rapid focusing is made possible by adopting the so-called rear focusing method, or by axially moving the lens sub-component III-1 of negative power which is of small size and light weight. By the use of the meniscus singlet of forward convexity as the second lens component II, good stability of aberration correction is maintained over the entire focusing range.

In this embodiment, an aperture stop S is positioned in rear of the second lens component II of such form so that the spherical center of the lens lies toward the aperture stop S. Thereby, the axial beam is largely refracted, but the oblique beam is as little refracted as possible. So, the difference in the height of the axial ray from the optical axis can be utilized to obtain the soft focus effect when the lens II is moved, while nevertheless maintaining the aberrations other than spherical aberration at a minimum.

As is understandable from the foregoing, in the embodiment of the invention, no additional special lens component is brought into the lens system. Instead, one of the lens components, which are all useful for normal photography, is made movable to introduce softening effects into the photographic image. And, the soft-focusing lens component and the normal focusing lens component are not made in common to prevent the complexity of the structure of construction of the lens mounting mechanism from increasing.

The above-described features suffice for accomplishing the objects of the invention. Yet to improve the efficiency with which the softening effect is produced, the focal lengths f and $f_{II}$ of the entire system and the second lens component II respectively fall in the following range:

$$-0.5 < f/f_{II} < 0$$

When this condition is satisfied, the aberrations other than spherical aberration are little produced, and the total soft focusing movement can be reduced to efficiently obtain the softening effect. If the above-stated condition is violated, the various aberrations other than spherical aberration are increased objectionably when soft focusing.

Also, in this embodiment, it is preferred that at least one of the lens surfaces of the second lens component II is aspherical. Relying on this feature, the refractive power can be increased in the marginal zone alone to affect only spherical aberration largely, while giving almost no influence to the other various aberrations. Thus, any desired soft focus amount (amount of spherical aberration) can be easily obtained.

In this embodiment, to achieve an improvement of the correction of the various aberrations over the entire image format and an improvement of the stability of aberration correction throughout the entire focusing range, it is preferred that the first lens component I be constructed with three lenses, or two bi-convex lenses and one bi-concave lens, and the sub-component III-1 of the third lens component III be constructed with a doublet consisting of positive and negative lenses cemented together.

It should be noted that the second lens component II may be otherwise constructed with two or more lenses including positive or negative one, provided that the first and last lens surfaces of this component are convex toward the front.

Two numerical examples of the invention are next shown in the following tables for the radii of curvature, R, the axial thicknesses or air separations, D, and the refractive indices, N, and Abbe numbers, $\nu$, of the glasses of the lens elements with the subscripts numbered consecutively from front to rear.

An equation of the spherical surface in coordinates with the X-axis in the optical axis and H-axis in the direction perpendicular to the optical axis, the direction in which the light advances being taken as positive, is given by the following expression:

$$X = \frac{(1/R)H^2}{1 + \sqrt{1 - (H/R)^2}} + AH^2 + BH^4 + CH^6 + DH^8 + EH^{10}$$

where R is the radius of curvature of the osculating sphere, and A, B, C, D and E are the aspherical coefficients.

It is to be noted that the image shift resulting from the soft focusing is compensated for by the lens component III-1.

Numerical Example 4

F = 135  FNO = 3.4 − 2.8  2ω = 18.2°

| | | |
|---|---|---|
| R1 = 50.67 | D1 = 9.00 | N1 = 1.62299  $\nu 1$ = 58.2 |
| R2 = −2495.01 | D2 = 0.15 | |
| R3 = 92.46 | D3 = 5.50 | N2 = 1.62299  $\nu 2$ = 60.7 |
| R4 = −376.32 | D4 = 1.71 | |
| R5 = −195.53 | D5 = 2.20 | N3 = 1.80518  $\nu 3$ = 25.4 |
| R6 = 133.01 | D6 = variable | |
| R7 = 30.44 | D7 = 2.60 | N4 = 1.58313  $\nu 4$ = 59.4 |
| R8 = 26.23 | D8 = variable | |
| R9 = aperture stop | D9 = variable | |
| R10 = −93.04 | D10 = 2.70 | N5 = 1.75520  $\nu 5$ = 27.5 |
| R11 = −42.03 | D11 = 1.39 | N6 = 1.54072  $\nu 6$ = 47.2 |
| R12 = 38.39 | D12 = variable | |
| R13 = 92.51 | D13 = 5.30 | N7 = 1.48749  $\nu 7$ = 70.2 |
| R14 = −68.92 | | |

| | D6 | D8 | D9 | D12 |
|---|---|---|---|---|
| Normal | 0.8 | 17.57 | 6 | 19.8 |
| Soft Focus | 10 | 8.37 | 3.6 | 22.2 |

The aspherical coefficients for R7:

A = 0

B = −5.880 × 10$^{-7}$

C = −1.588 × 10$^{-10}$

D = −2.038 × 10$^{-12}$

E = 2.540 × 10$^{-16}$

Numerical Example 5

F = 135  FNO = 1:3.17 − 2.8  2ω = 18.2°

| | | |
|---|---|---|
| R1 = 50.56 | D1 = 10.56 | N1 = 1.43387  $\nu 1$ = 95.1 |
| R2 = −172.05 | D2 = 0.21 | |
| R3 = 75.15 | D3 = 7.30 | N2 = 1.49700  $\nu 2$ = 81.6 |
| R4 = −500.28 | D4 = 1.64 | |
| R5 = −148.62 | D5 = 2.43 | N3 = 1.72047  $\nu 3$ = 34.7 |
| R6 = 240.83 | D6 = variable | |
| R7 = 29.54 | D7 = 2.77 | N4 = 1.58913  $\nu 4$ = 61.0 |
| R8 = 27.68 | D8 = variable | |
| R9 = aperture stop | D9 = 2.00 | |
| R10 = 82.30 | D10 = 3.12 | N5 = 1.75520  $\nu 5$ = 27.5 |
| R11 = −30.32 | D11 = 1.39 | N6 = 1.61340  $\nu 6$ = 43.8 |
| R12 = 40.28 | D12 = 16.00 | |
| R13 = 190.97 | D13 = 6.00 | N7 = 1.69680  $\nu 7$ = 55.5 |
| R14 = −49.79 | D14 = 1.5 | N8 = 1.68950  $\nu 8$ = 30.1 |
| R15 = −77.57 | | |

| | D6 | D8 |
|---|---|---|
| Normal | 4.2 | 12.66 |
| Soft Focus | 10.5 | 6.46 |

The aspherical coefficients for R8:

A = 0

B = 7.669 × 10$^{-7}$

C = −1.121 × 10$^{-10}$

D = 7.536 × 10$^{-12}$

E = −2.724 × 10$^{-16}$

According to the present invention, the form and the construction and arrangement of the elements of the objective are so properly specified that without arranging a special lens component, a lens component constituting an integral part of the objective is made movable to soften the photographic image with high efficiency. Moreover, by making the focusing provision in any lens component other than the soft-focusing lens component, a minimization of the complexity of the structure of an operating mechanism for such objective having the soft-focus function is achieved.

Next, we explain about an embodiment of a camera system using the above-described objective according to the invention wherein the focusing is automatically corrected by utilizing focus detecting means to insure that an excellent softening result can be easily attained, while still permitting shots to be taken quickly.

Figure 16:
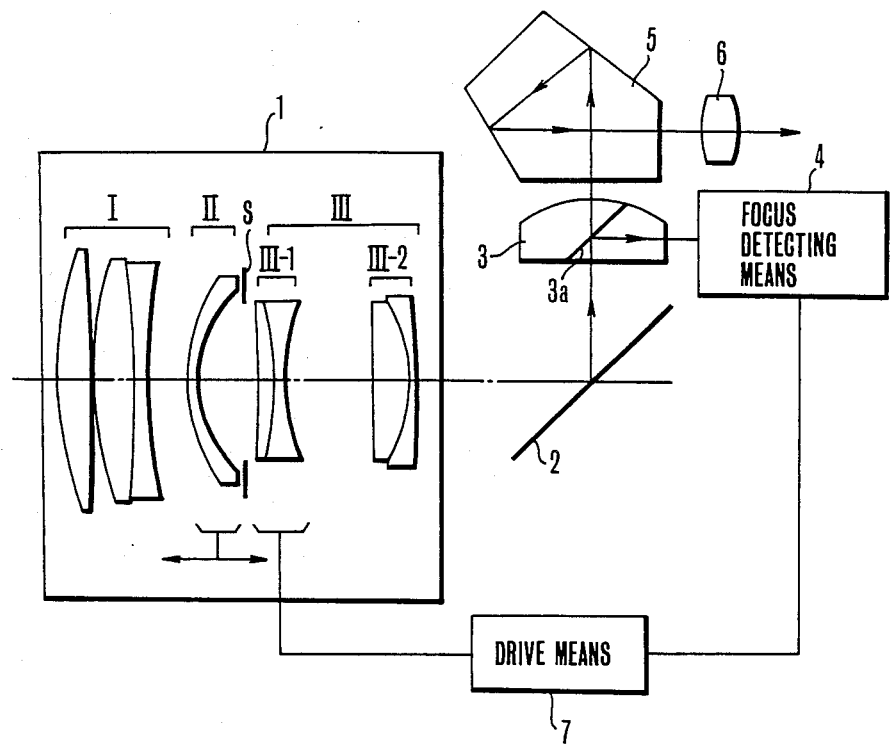
FIG. 16 is a schematic view of an embodiment of a photographic system according to the present invention.

FIG. 16 schematically illustrates the camera system comprising a photographic objective 1, a flippable mirror 2, a condenser lens 3 having a half-mirror 3a in the interior thereof, focus detecting means 4, a pentagonal roof type prism 5, an eyepiece lens 6 and drive means 7. It is to be noted here that the focus detecting means 4, though illustrated as arranged at the side of the condenser lens 3, may be positioned on the bottom of a mirror box and cooperate with a sub-mirror for conducting the permeating beam through the mirror 2 toward the means 4.

The objective 1 is constructed in accordance with the numerical data given in the above-cited tables, comprising the first lens component I, the second lens component II axially movable for soft focusing, and the third lens component III. The third lens component III comprises a sub-component III-1 axially movable for focusing, and a second sub-component III-2 stationary during focusing.

The focus detecting means 4 receives light passing through the objective 1 and reflected from the mirror 2 and the half-mirror 3a and performs focus detection by the patterns correlation method to be described more fully later as disclosed, for example, in Japanese Laid-Open Patent Application Nos. Sho 55-155331 and Sho 58-106511. On account of the large amount of spherical aberration introducible into the image, the correlation method is more suited to the aforesaid purpose than any of the other focus detecting methods.

Responsive to the output signal from the focus detecting means 4, the drive means 7 moves the focusing lens component III-1 to compensate for the image shift.

In this connection, it should be explained that, in order to efficiently obtain the softening effect, the photographic objective generally has a shallow depth of field with preferably somewhat fast a speed of, for example, not more than 2.8 in the F-number at full open aperture.

Many photographic objectives for 35 mm film are corrected for as little spherical aberration as possible so that good optical performance is obtained in a range from infinity to the minimum object distance when in normal photography. When in soft focus photography, on the other hand, a few millimeters of spherical aberration at F2.8 or thereabout is introduced into the photographic image in such a way as to obtain a good soft focus effect that the central portion of the image format is in sharp focus, and the surrounding portion is diffused like having soft flare.

Therefore, the movement of the soft-focusing lens component causes the image plane of sharpest focus to shift. When soft focusing, however, because of too much increased spherical aberration, for the naked eye, it becomes very difficult to accurately adjust focusing so long as the aid is an optical member such as a split prism or micro prism. Particularly noted here is that in most of such objectives when in soft focus position, if the amount of spherical aberration at F2.8 is several millimeters, then there remains at least 1 mm even at F8. With the diaphragm even if closed down to F8 or below, therefore, visual focusing would be difficult to assure production of a good soft focus effect.

So, in the embodiment of the invention, the shift of the best image plane resulting from the soft focusing movement of the second lens component II is detected by the focus detecting means 4. By utilizing the output signal from the focus detecting means 4, the focusing lens component III-1 is moved by the drive means 7 to automatically compensate for that image shift.

Particularly, in this embodiment, the objective is corrected so that the spherical aberration, which is ascribable to the axial beam at 8 or below in the F-number, falls in a range of 0.2 to 1 mm. By using the light beam whose diameter is smaller than that at F8, accurate focus detection is performed. It should be noted that the value of the diameter of the light beam is not limited to F8. If within the acceptable accuracy range for the focus detecting device, F6 or thereabout is even usable in practice.

Next, the outline of the focus detecting means in the embodiment of the invention is next described by reference to FIG. 17. The focus detecting device 4 is positioned on the image side of the photographic objective 1. This focus detecting device 4 has two secondary image forming lenses 4a and 4b behind the, focal plane of the photographic objective 1. It should be noted that the lens components I, II and III are represented by one lens 1 for the purpose of convenience. An array of photoelectric transducer elements 4c and 4d such as CCDs are arranged in rear of the lenses 4a and 4b, respectively. Light from an object to be photographed passes through the photographic lens 1 and the secondary image forming lenses 4a and 4b to form two images of the same object on the photoelectric transducer element array 4c, 4d. From the difference between the positions of these two images, a single processing circuit 4e measures the defocus and produces an output signal which is applied to, a drive circuit 7, thereby respectively, the focusing lens sub-component III-1 is moved until the photographic lens 1 is suitably focused on the object. In short, the focus detecting device 4 seeks for the direction and amount of movement of the focusing lens component based on the defocus amount of the photographic lens 1, controlling the operation of the drive circuit 7.

It should be pointed out here that while the F-number of the photographic lens 1 in this embodiment is, for example, respectively F2.8 at full open aperture, the secondary image forming lenses 4a and 4b are designed not to admit the full diameter of the photographic lens 1, but that fraction of it which corresponds to F6 or F8 or larger aperture value by taking into account the increased spherical aberration as has been described above. This enables a stable focus detection to be achieved.

According to the present invention, when the photographic objective is switched from the normal to the soft focus position, the resultant shift of the best image plane is automatically compensated for by using the focus detecting means to allow for quick taking of shots with good soft focus effect, and further the softening and focusing provisions are made in different lens components from each other to achieve a minimization of the complexity of the structure of construction of the lens mounting mechanism.

What is claimed is:

1. A photographic system having a soft focus function, comprising: from the object side,
    a first lens component of positive power;
    a second lens component formed as a single meniscus shaped lens convexed toward the object side and having both its lens surfaces free so as to be contactable by air; and
    a third lens component;
    whereby said second lens component is moved axially to effect a softening result.

2. A photographic system having a soft focus function, comprising: from the object side,
    a first lens component of positive power;
    a second lens component of meniscus shape convexed toward the object side; and
    a third lens component having at least one lens made movable for focusing, whereby said second lens component is moved axially to effect a softening result.

3. A photographic system having a soft focus function, comprising: from the object side,
a first lens component of positive power;
a second lens component of meniscus shape convexed toward the object side; and
a third lens component, whereby said second lens component is moved axially to effect a softening result, said photographic system satisfying the following condition:

$$-0.8 < f/f_{II} < 0.1$$

where f and $f_{II}$ are the focal length of the entire system and said second lens component, respectively.

4. A photographic system having a soft focus function, comprising: from the object side,
a first lens component of positive power;
a second lens component of meniscus shape convexed toward the object side, at least one of the lens surfaces of said second lens component being aspheric; and
a third lens component, whereby said second lens component is moved axially to effect a softening result.

5. A photographic system having a soft focus function, comprising: from the object side,
a first lens component of positive power;
a second lens component of meniscus shape convexed toward the object side; and
a third lens component including at least a front sub-component of negative power, and rear sub-component of positive power, whereby at least one of said two sub-components is made movable for focusing, said second lens component being axially movable to effect softening, and the effective diameter of said second lens component being determined by the maximum axial light beam taken when the soft effect is produced.

6. A system according to claim 5, wherein said front sub-component is made movable for focusing.

7. A photographic system having a soft focus function, comprising: from the object side,
a first lens component of positive power;
a second lens component formed as a single meniscus shaped lens convexed toward the object side and having both its lens surfaces free so as to be contactable by air; and
a third lens component;
whereby said second lens component is made axially movable to effect softening, and the effective diameter of said second lens component is determined by the maximum axial light beam taken when the soft effect is produced.

8. A photographic system having a soft focus function comprising:
(a) a photographic optical system including on an optical axis thereof at least:
(i) movable lens means for soft focus effect; and
(ii) focusing lens means for focusing purposes; (b) detecting means,
said detecting means detecting a defocus amount produced when said movable lens means has moved, and producing an output signal on moving information of said focusing lens means; and
(c) driving means,
said driving means moving said focusing lens means on the basis of the output signal of said detecting means.

9. A system according to claim 8, wherein said photographic optical system comprises: from the object side,
a first lens component of positive power;
a second lens component having said movable lens means in meniscus form convex toward the object side; and
a third lens component having said focusing lens means.

10. A system according to claim 8, wherein said detecting means uses a light beam passing through said photographic optical system to produce said output signal based on said moving information.

11. A system according to claim 8, wherein said detecting means comprises light pattern forming optical means for forming light patterns based on images of an object whose relative positions vary with variation of the focus adjusting state of said photographic optical system, and sensing means having a plurality of photosensors arranged upon sensing of said light patterns to form a signal concerning the focus adjusting state of said photographic optical system.

* * * * *